(12) United States Patent
Waymeyer et al.

(10) Patent No.: US 11,038,351 B2
(45) Date of Patent: Jun. 15, 2021

(54) SYSTEM AND METHOD FOR POWER SHARING BETWEEN A PLURALITY OF ELECTRICAL APPLIANCES ON AN ALTERNATING CURRENT CIRCUIT

(71) Applicant: Haier US Appliance Solutions, Inc., Wilmington, DE (US)

(72) Inventors: Jordan Andrew Waymeyer, Louisville, KY (US); Timothy D. Worthington, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/531,243

(22) Filed: Aug. 5, 2019

(65) Prior Publication Data
US 2021/0044111 A1 Feb. 11, 2021

(51) Int. Cl.
*H02J 3/14* (2006.01)
*H04L 12/28* (2006.01)
*H02J 13/00* (2006.01)

(52) U.S. Cl.
CPC .......... *H02J 3/14* (2013.01); *H02J 13/00001* (2020.01); *H04L 12/2803* (2013.01); *H02J 2310/14* (2020.01)

(58) Field of Classification Search
CPC ........................................................ H02J 3/14
USPC ........................................................ 700/295
See application file for complete search history.

(56) References Cited

U.S. PATENT DOCUMENTS

| | | | |
|---|---|---|---|
| 6,493,643 B1 | 12/2002 | Aisa | |
| 6,826,267 B2 | 11/2004 | Daum et al. | |
| 7,173,226 B2 | 2/2007 | Kang | |
| 8,219,258 B1* | 7/2012 | Almeida | G06N 7/005 |
| | | | 700/291 |
| 8,386,202 B2 | 2/2013 | Aisa et al. | |
| 9,967,923 B2 | 5/2018 | Moon et al. | |
| 2009/0287578 A1* | 11/2009 | Paluszek | G07F 17/0014 |
| | | | 705/17 |
| 2014/0371942 A1* | 12/2014 | Matsuyama | H02J 3/14 |
| | | | 700/297 |
| 2015/0244185 A1* | 8/2015 | Won | H02J 7/008 |
| | | | 320/103 |

(Continued)

FOREIGN PATENT DOCUMENTS

WO WO2016197182 A1 12/2016

*Primary Examiner* — Suresh Suryawanshi
(74) *Attorney, Agent, or Firm* — Dority & Manning, P.A.

(57) ABSTRACT

A method for power sharing between a plurality of electrical appliances electrically coupled to an AC circuit is provided. The method can include obtaining, by one or more control devices of a first electrical appliance of the plurality of electrical appliances, data indicative of a request of a second electrical appliance of the plurality of electrical appliances to switch from a first power mode to a second power mode. In response to obtaining the data indicative of the request, the method can further include determining, by the one or more control devices, whether any of the plurality of electrical appliances are currently configured in the second power mode. Furthermore, in response to determining none of the plurality of electrical appliances are currently configured in the second power mode, the method can include transmitting, by the one or more control devices, data indicative of approval of the request.

18 Claims, 6 Drawing Sheets

(56) References Cited

U.S. PATENT DOCUMENTS

2018/0196490 A1* 7/2018 Ail ........................ G06F 1/3209
2020/0220352 A1* 7/2020 Lui ................... H02J 13/00004

* cited by examiner

SYSTEM AND METHOD FOR POWER SHARING BETWEEN A PLURALITY OF ELECTRICAL APPLIANCES ON AN ALTERNATING CURRENT CIRCUIT

FIELD OF THE INVENTION

The present subject matter relates generally to a system and method for power sharing between a plurality of electrical appliances on an alternating current circuit.

BACKGROUND OF THE INVENTION

A standalone refrigerator and a standalone freezer can, in some instances, be installed in a side-by-side configuration such that the refrigerator and the freezer are on the same alternating current circuit. Furthermore, since the refrigerator and the freezer are standalone appliances, the refrigerator and freezer each have various electrical loads, such as a compressor. When the refrigerator and the freezer are on the same alternating circuit and each implement a defrost cycle, the combined current draw of the refrigerator and the freezer can exceed a current rating of a circuit breaker associated with the electrical circuit. In this manner, the circuit breaker can trip and cause the refrigerator and the freezer to lose power, which can cause food within the refrigerator and the freezer to spoil.

BRIEF DESCRIPTION OF THE INVENTION

Aspects and advantages of the present disclosure will be set forth in part in the following description, or may be obvious from the description, or may be learned through practice of the present disclosure.

In one aspect, a method for power sharing between a plurality of electrical appliances electrically coupled to an AC circuit is provided. The method can include obtaining, by one or more control devices of a first electrical appliance of the plurality of electrical appliances, data indicative of a request of a second electrical appliance of the plurality of electrical appliances to switch from a first power mode to a second power mode. In response to obtaining the data indicative of the request, the method can further include determining, by the one or more control devices, whether any of the plurality of electrical appliances are currently configured in the second power mode. Furthermore, in response to determining none of the plurality of electrical appliances are currently configured in the second power mode, the method can include transmitting, by the one or more control devices, data indicative of approval of the request.

In another aspect, a system for power sharing between a plurality of electrical appliances electrically coupled to an AC circuit is provided. The system includes a communication circuit onboard each of the plurality of electrical appliances. The communication circuit can be configured to facilitate communication between each of the plurality of electrical appliances. The system further includes one or more control devices onboard each of the plurality of electrical appliance. The one or more control devices can be configured to obtain data indicative of a request of an electrical appliance of the plurality of electrical appliances to switch from a first power mode to a second power mode. Furthermore, the one or more control devices can be configured to determine whether any of the plurality of electrical appliances are currently operating in the second power mode in response to obtaining the data indicative of the request. In addition, the one or more control devices can be configured to transmit data indicative of approval of the request in response to determining none of the plurality of electrical appliances are operating in the second power mode.

These and other features, aspects and advantages of the present disclosure will become better understood with reference to the following description and appended claims. The accompanying drawings, which are incorporated in and constitute a part of this specification, illustrate embodiments of the invention and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference now will be made in detail to example embodiments of the present disclosure, which are illustrated in the drawings. Each example embodiment is provided by way of explanation of the present disclosure, and should not be construed as a limitation of the present disclosure. In fact, it will be apparent to those skilled in the art that various modifications and variations can be made to the example embodiments of the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to a system for power sharing between a plurality of electrical appliances electrically coupled to an alternating current (AC) circuit. Each of the plurality of electrical appliances can include a power cord configured to be plugged into a wall outlet associated with the AC circuit. In this manner, each of the plurality of electrical appliances can be electrically coupled to the AC circuit via the power cord. As will be discussed below in more detail, the plurality of electrical appliances can be in communication with one another to facilitate power sharing.

The system can include a communication circuit installed onboard each of the plurality of electrical appliances. In some implementations, the communication circuit can be communicatively coupled to one or more conductors of the power cord associated with a corresponding electrical appliance of the plurality of electrical appliances. In this manner, the plurality of electrical appliances can be configured to communicate with one another via the AC circuit.

In some implementations, the communication circuit can be configured to facilitate communication over a wireless network. It should be appreciated that the communication circuit can be configured to facilitate communication over any suitable type of wireless network. For instance, in some implementations, communication circuit can be configured to facilitate communication over a Bluetooth network. Alternatively or additionally, the communication circuit can be configured to facilitate communication over a Wifi network.

The system can include one or more control devices onboard each of the plurality of electrical appliances. The one or more control devices can be operatively coupled to the communication circuit. In this manner, the one or more control devices onboard a first electrical appliance of the plurality of electrical appliances can communicate with the one or more control devices onboard a second electrical appliance of the plurality of electrical appliances.

In some implementations, the one or more control devices onboard the first electrical appliance can be configured to broadcast a message each time the first electrical appliance is activated (e.g., powered on). For instance, the message can be broadcast to every other electrical appliance of the plurality of electrical appliances that are activated. In this manner, the one or more control devices onboard the first electrical appliance can discover whether there are any electrical appliances available for power sharing.

In some implementations, the one or more control devices onboard the first electrical appliance and the one or more control devices onboard each of the electrical appliances available for power sharing can be configured to generate a random number to determine a master electrical appliance. For instance, the electrical appliance having the highest random number can be the master electrical appliance. It should be appreciated that each of the remaining electrical appliances can be considered a slave electrical appliance. As will be discussed below in more detail, the one or more control devices onboard the master electrical appliance can be configured to manage requests from one or more slave electrical appliances to switch from a first or normal power mode to a second or high power mode.

The one or more control devices onboard the master electrical appliance can obtain data indicative of a request of a slave electrical appliance to switch from the first power mode to the second power mode. For instance, the one or more control devices can obtain the data indicative of the request via the AC circuit. Alternatively, the one or more control devices can obtain the data indicative of the request via the wireless network.

In response to obtaining the data indicative of the request, the one or more control devices onboard the master electrical appliance can be configured to determine whether any of the plurality of electrical appliances is currently configured in the second power mode. When the one or more control devices of the master electrical appliance determine the master electrical appliance and no other slave electrical appliances are currently configured in the second power mode, the one or more control devices can be configured to transmit data indicating approval of the request. In some implementations, the one or more control devices of the master electrical appliance can transmit the data via the AC circuit. Alternatively, the one or more control devices of the master electrical appliance can transmit the data via the wireless network. It should be understood that the one or more control devices of the slave appliance can, upon receiving the data indicative of approval of request, configure the slave electrical appliance in the second power mode.

It should also be appreciated that a total current the plurality of electrical appliances draw when one of the plurality of electrical appliances is configured in the second power mode is less than a rated current of a circuit breaker associated with the AC circuit. In this manner, the one or more control devices of the master electrical appliance can manages requests from slave electrical appliances such that only one of the plurality of electrical appliances is configured in the second power mode at a time.

Conversely, when the one or more control devices onboard the master electrical appliance determine the master electrical appliance or another slave electrical appliance is currently configured in the second power mode, the one or more control devices can be configured to add the request of the slave electrical appliance to a queue. It should be understood that the one or more control devices of the master electrical appliance can transmit the data indicating approval of the request when the one or more control devices determine the master electrical appliance and no other slave electrical appliances are configured in the second power mode.

The system of the present disclosure provides numerous technical benefits. For instance, the communication circuit onboard each of the plurality of electrical appliances can, as discussed above, be configured to facilitate communication via the AC circuit. In this manner, the system can be implemented without requiring additional cabling. Furthermore, since the one or more control devices onboard each of the plurality of electrical appliances can be configured to allocate power such that the plurality of electrical appliances are configured in the second power mode one at a time. In this manner, the system according to the present disclosure can share power amongst the plurality of electrical appliances such that a total current the plurality of electrical appliances draw from an AC power source is less than a rated current of a circuit breaker associated with the AC circuit.

As used herein, the use of the term "about" in conjunction with a numerical value refers to within 5% of the stated numerical value. In addition, the terms "first", "second" and "third" may be used interchangeably to distinguish one component from another and are not intended to signify location or importance of the individual components.

Figure 1:
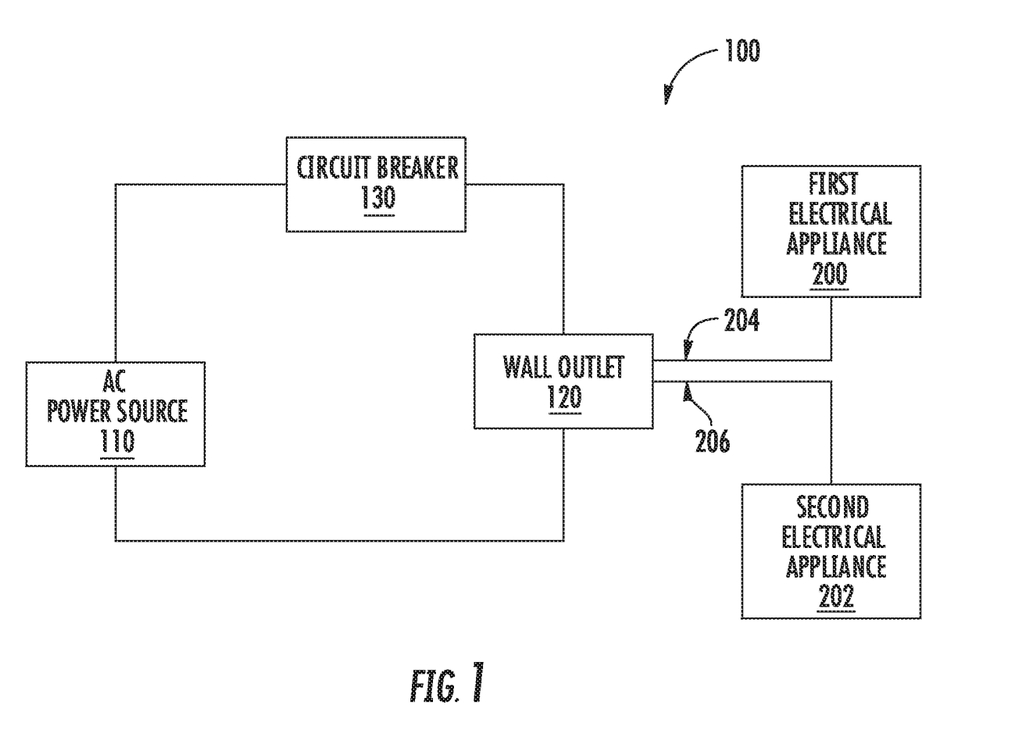
FIG. 1 depicts an AC circuit according to example embodiments of the present disclosure.

Referring now to FIG. 1, components of an AC circuit 100 are provided according to example embodiments of the present disclosure. As shown, the AC circuit 100 can include an AC power source 110 (e.g., mains power source) configured to provide AC power. The AC circuit 100 can include a wall outlet 120. As shown, a first electrical appliance 200 and a second electrical appliance 202 can be electrically coupled to the AC circuit 100 at the wall outlet 120. For instance, a power cord 204 of the first electrical appliance 200 can be plugged into the wall outlet 120 to electrically couple the first electrical appliance 200 to the AC circuit 100 at the wall outlet 120. Likewise, a power cord 206 of the second electrical appliance 202 can be plugged into the wall outlet 120 to electrically couple the second electrical appliance 202 to the AC circuit 100 at the wall outlet 120. In this manner, the first electrical appliance 200 and the second electrical appliance 202 can receive AC power from the AC power source 110.

It should be appreciated that the AC circuit 100 can include additional wall outlets. For instance, in some implementations, the AC circuit 100 can include two or more wall outlets. In this manner, the first electrical appliance 200 and the second electrical appliance 202 can be electrically coupled to the AC circuit 100 at different wall outlets. For example, the power cord 204 of the first electrical appliance 200 can be plugged into a first wall outlet, whereas the power cord 206 of the second electrical appliance 202 can be plugged into a second wall outlet that is different than the first wall outlet.

As shown, the AC circuit 100 can include a circuit breaker 130 coupled between the AC power source 110 and the wall outlet 120. The circuit breaker 130 can be configured to decouple the wall outlet 120 from the AC power source 110 when a fault (e.g., short circuit, overvoltage, etc.) is detected. For example, the circuit breaker 130 can be configured to decouple the wall outlet 120 from the AC power source 110 when the sum of a current the first electrical appliance 200 draws from the AC power source 110 and a current the second electrical appliance 202 draws from the AC power source 110 is greater than a rated current of the circuit breaker 130. As will be discussed below, the present disclosure is directed to a system and related method for power sharing between a plurality of electrical appliances electrically coupled to the AC circuit 100 to prevent nuisance tripping of the circuit breaker 130.

Figure 2:
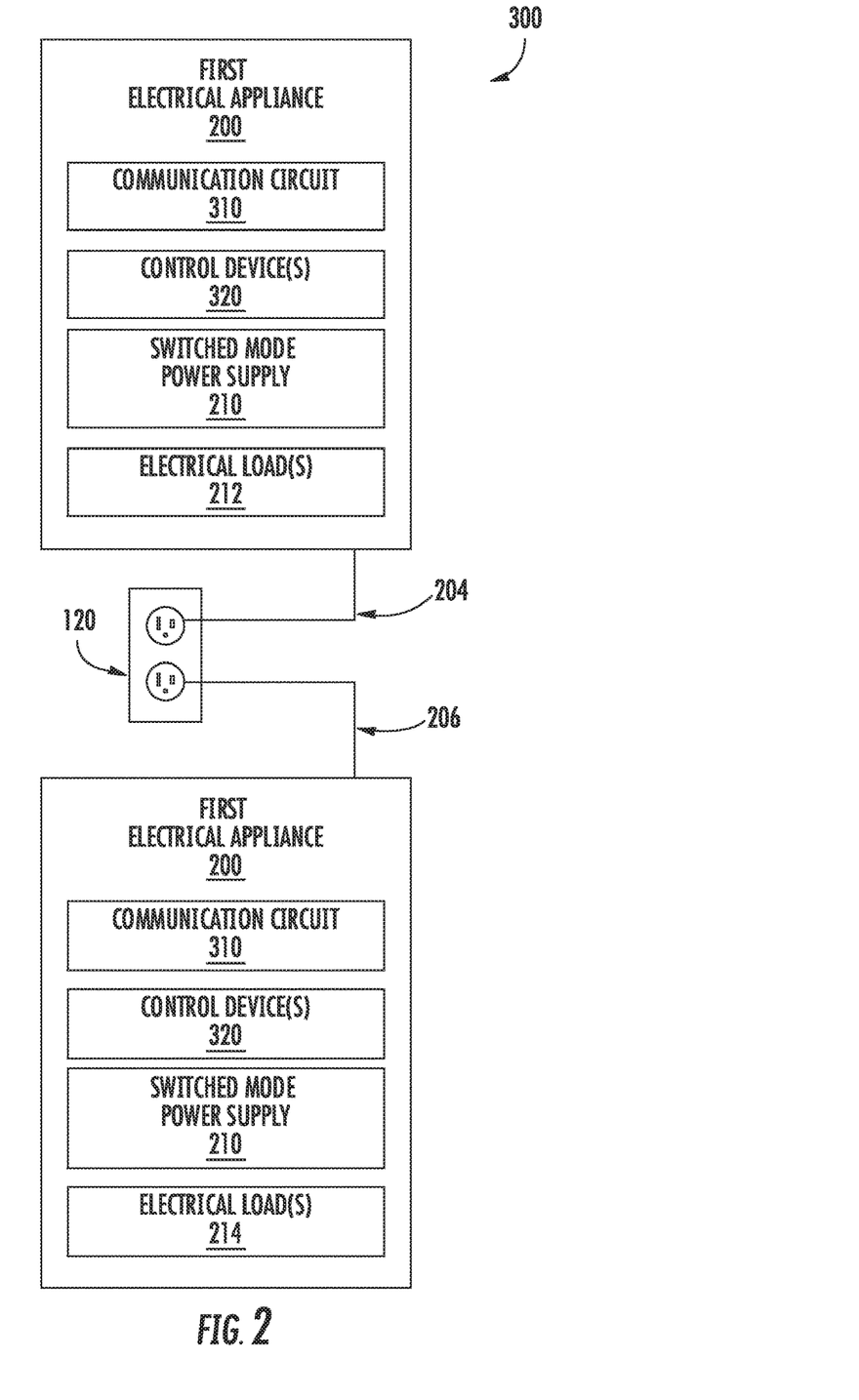
FIG. 2 depicts an example system for power sharing between a plurality of electrical appliances electrically coupled to an alternating current circuit according to example embodiments of the present disclosure.
Figure 3:
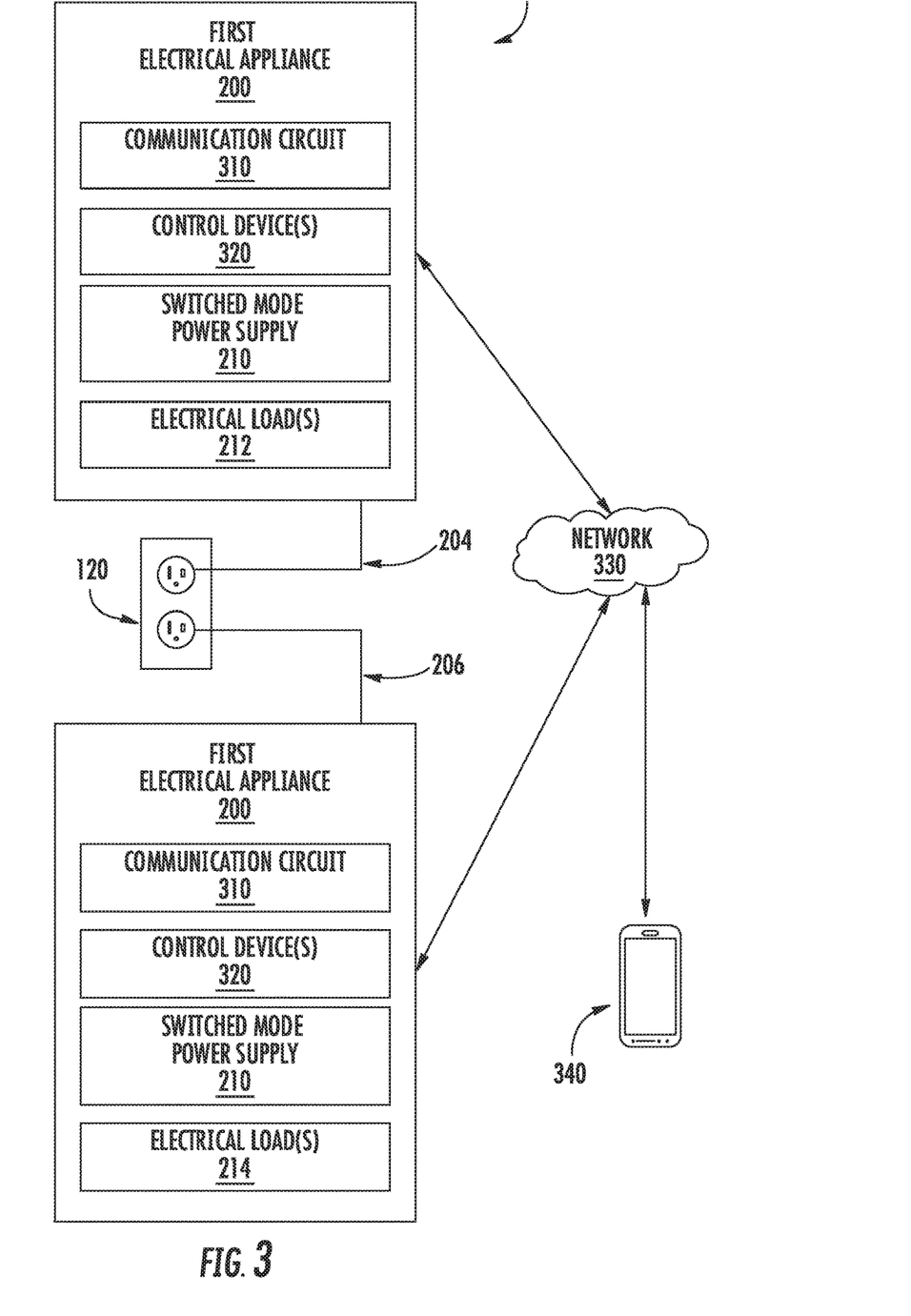
FIG. 3 depicts another example system for power sharing between a plurality of electrical appliances electrically coupled to an alternating current circuit according to example embodiments of the present disclosure.

Referring now to FIGS. 2 and 3, a system 300 for power sharing between a plurality of electrical electrically coupled to the AC circuit 100 (FIG. 2) at the wall outlet 120 is provided according to example embodiments of the present disclosure. As shown, the plurality of electrical appliances can include the first electrical appliance 200 and the second electrical appliance 202. However, it should be understood that, in some implementations, the plurality of electrical appliances can include more than two electrical appliances.

In some implementations, the first electrical appliance 200 can be a refrigerator and the second electrical appliance 202 can be a freezer. More specifically, the refrigerator and the freezer can be installed in a side-by-side configuration. It should be appreciated, however, that the first electrical appliance 200 and the second electrical appliance 202 can include any suitable type of electrical appliance. For instance, in some implementations, the first electrical appliance 200 can be a dishwasher and the second electrical appliance 202 can be a microwave.

In some implementations, the first electrical appliance 200 and the second electrical appliance 202 can each include a switched mode power supply 210. The switched mode power supply 210 of the first electrical appliance 200 can be configured to convert AC power from the AC power source 110 (FIG. 1) into direct current (DC) power suitable for one or more electrical loads 212 of the first electrical appliance 200. Likewise, the switched mode power supply 210 of the second electrical appliance 202 can be configured to convert AC power from the AC power source 110 into DC power suitable for one or more electrical loads 214 of the second electrical appliance 202.

As shown, the system 300 can include a communication circuit 310 installed onboard the first electrical appliance 200 and the second electrical appliance 202. In this manner, the first electrical appliance 200 and the second electrical appliance 202 can communicate with one another. In some implementations, the switched mode power supply 210 of the first electrical appliance 200 can be configured to provide non-isolated DC power to the communication circuit 310 of the first electrical appliance 200. Alternatively or additionally, the switched mode power supply 210 of the second electrical appliance 202 can be configured to provide non-isolated DC power to the communication circuit 310 of the second electrical appliance 202.

In some implementations, the communication circuit 310 of the first electrical appliance 200 can be in electrical communication with one or more conductors (e.g. wires) of the power cord 204 of the first electrical appliance 200. Likewise, the communication circuit 310 of the second electrical appliance 202 can be in communication with one or more conductors (e.g., wires) of the power cord 206 of the second electrical appliance 202. In this manner, the first electrical appliance 200 and the second electrical appliance 202 can communicate with one another via the AC circuit 100 (FIG. 1). More specifically, the communication circuit 310 of the first electrical appliance 200 can transmit data to the communication circuit 310 of the second electrical appliance 202 via one or more conductors (e.g., wires) of the AC circuit 100. Likewise, the communication circuit 310 of the second electrical appliance 202 can transmit data to the communication circuit 310 of the first electrical appliance 200 via the one or more conductors (e.g., wires) of the AC circuit 100.

In some implementations, the communication circuit 310 of the first electrical appliance 200 and the communication circuit 310 of the second electrical appliance 202 can be configured to communicate with one another via a wireless network 330. For instance, in some implementations, the wireless network 330 can be a Bluetooth network. It should be appreciated, however, that the communication circuit 310 of the first electrical appliance 200 and the communication circuit 310 of the second electrical appliance 202 can be configured to communicate with one another via any suitable wireless network. For instance, in some implementations, the wireless network 330 can be a Wifi network.

As shown, the system 300 can include control device(s) 320 onboard the first electrical appliance 200 and the second electrical appliance 202. In some implementations, the switched mode power supply 210 of the first electrical appliance 200 can be configured to provide non-isolated DC power to the control device(s) 320 of the first electrical appliance 200. Alternatively or additionally, the switched mode power supply 210 of the second electrical appliance 202 can be configured to provide non-isolated DC power to the control device(s) 320 of the second electrical appliance 202.

In some implementations, the control device(s) 320 can be configured to transmit a message each time a corresponding electrical appliance is activated (e.g., powered on) to discover other electrical appliances available for power sharing. For example, the control device(s) 320 of the first electrical appliance 200 can be configured to transmit the message each time the first electrical appliance 200 is activated. Likewise, the control device(s) 320 of the second electrical appliance 202 can be configured to transmit the message each time the second electrical appliance 202 is activated.

When the control device(s) 320 of the first electrical appliance 200 do not detect other electrical appliances (e.g., second electrical appliance 202) available for power sharing, the control device(s) 320 of the first electrical appliance 200 can be configured to determine whether any pending requests exists for the first electrical appliance 200 to switch from a first power mode (e.g., normal power mode, low power mode) to a second power mode (e.g., high power mode). In some implementations, a current the first electrical appliance 200 draws when operating in the second power mode can be greater than about 40% of the rated current of the circuit breaker 130 (FIG. 1) of the AC circuit 100.

When the control device(s) 320 of the first electrical appliance 200 determine there are one or more pending requests for the first electrical appliance 200 to switch from the first power mode to the second power mode, the control device(s) 320 of the first electrical appliance 200 can configure the first electrical appliance 200 in the second power mode. Otherwise, the first electrical appliance 200 can continue to operate in the first power mode.

It should be understood that the control device(s) 320 of the second electrical appliance 202 can be configured to operate in a similar manner when the control device(s) 320 of the second electrical appliance 202 do not detect other electrical appliances (e.g., first electrical appliance 200) available for power sharing. For instance, the control device(s) 320 of the second electrical appliance 202 can be configured to determine whether any pending requests exists for the second electrical appliance 202 to switch from the first power mode to a second power mode.

When the control device(s) 320 of the first electrical appliance 200 do detect other electrical appliances available for power sharing, the control device(s) 320 of each of the electrical appliances available for power sharing can, in some implementations, be configured to generate a random number. As will be discussed below in more detail, the random number can be used to designate one of the electrical appliances available for power sharing, including the first electrical appliance 200, as a master electrical appliance.

For example, if the control device(s) 320 of the first electrical appliance 200 detect the second electrical appliance 202 is available for power sharing, the control device(s) 320 of the first electrical appliance 200 and the control device(s) 320 of the second electrical appliance 202 can each be configured to generate a random number. When the random number generated by the control device(s) 320 of the first electrical appliance 200 is greater than the random number generated by the control device(s) 320 of the second electrical appliance 202, the first electrical appliance 200 can be the master electrical appliance and the second electrical appliance 202 can be a slave electrical appliance.

It should be understood that the second electrical appliance 202 can be the master electrical appliance and the first electrical appliance 200 can be the slave electrical appliance when the rand number generated by the control device(s) 320 of the second electrical appliance 202 is greater than the random number generated by the control device(s) of first electrical appliance 200. It should also be understood that other suitable methods can be implemented to determine the master electrical appliance and the slave electrical appliances.

In some implementations, the control device(s) 320 of the first electrical appliance 200 or the control device(s) of the second electrical appliance 202 can obtain user-input indicating a third electrical appliance (not shown) that is electrically coupled to another AC circuit associated with a different circuit breaker is not available for power sharing. For instance, in some implementations, the user-input can be obtained via a user input device 340. As shown, the user input device 340 can, in some implementations, be a mobile computing device (e.g., smartphone). In alternative implementations, the user input device 340 can be a touch or touch-free display (e.g., LCD display) associated with the third electrical appliance.

When the master electrical appliance and the slave appliance(s) are determined, the control device(s) 320 of the master electrical appliance can obtain data indicative of a request from a slave electrical appliance to switch from the first power mode to the second power mode. For instance, in some implementations, the communication circuit 310 of the slave electrical appliance can transmit the data indicative of the request to the communication circuit 310 of the master electrical appliance via the AC circuit 100 (FIG. 1). Alternatively, the data indicative of the request can be transmitted from the slave electrical appliance to the master electrical appliance via the wireless network 330.

In response to obtaining the data indicative of the request, the control device(s) 320 of the master electrical appliance can be configured to determine whether the master electrical appliance or another slave electrical appliance is currently configured in the second power mode. If the control device(s) 320 determine none of the plurality of electrical appliances are currently configured in the second power mode, the control device(s) 320 of the master electrical appliance can be configured to transmit data indicative of approval of the request. In some implementations, the communication circuit 310 of the master electrical appliance can transmit the data indicative of approval of the request to the communication circuit 310 of the slave electrical appliance via the AC circuit 100 (FIG. 1). Alternatively, the data indicative of approval of the request can be transmitted from the master electrical appliance to the slave electrical appliance via the wireless network 330.

When the control device(s) 320 of the master electrical appliance determine the master appliance or another slave electrical appliance is currently configured in the second power mode, the control device(s) 320 of the master electrical appliance can be configured to add the request of the slave electrical appliance to a queue. It should be understood that the control device(s) 320 of the master electrical appliance can be configured to transmit data indicative of approval of the request when the control device(s) 320 determine no electrical appliances are still configured in the second power mode.

Figure 4:
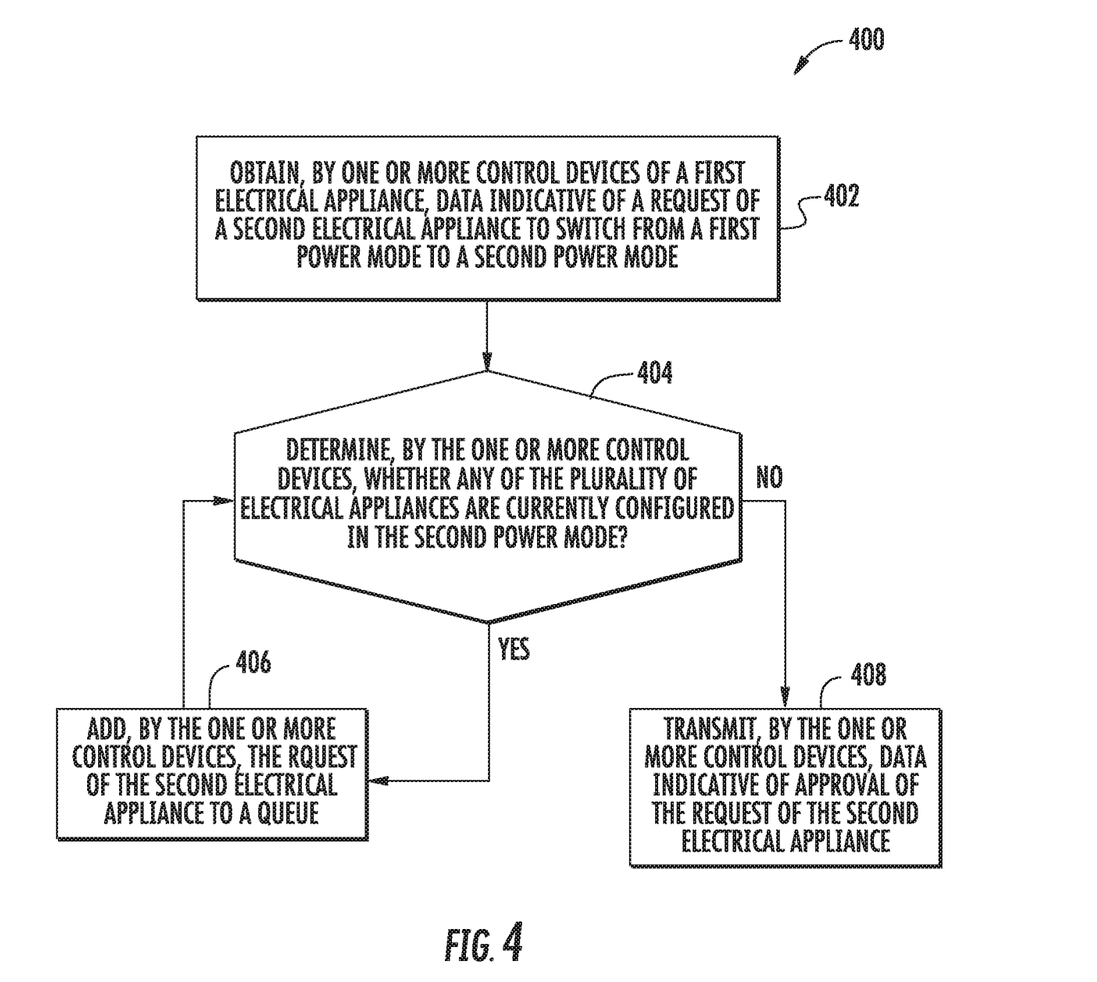
FIG. 4 depicts a flow diagram of a method for power sharing between a plurality of electrical appliances according to example embodiments of the present disclosure.

Referring now to FIG. 4, a flow diagram of a method 400 for power sharing between a plurality of electrical appliances electrically coupled to an AC circuit is provided according to example embodiments of the present disclosure. In general, the method 400 will be discussed herein with reference to the system 300 described above with reference to FIGS. 2 and 3. In addition, although FIG. 4 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (402), the method 400 includes obtaining, by one or more control devices of a first electrical appliance of the plurality of electrical appliances, data indicative of a request of a second electrical appliance of the plurality of electrical appliances to switch from a first power mode to a second power mode. In some implementations, the one or more control devices of the first electrical appliance can obtain the data indicative of the request via the AC circuit. In alternative implementations, the one or more control devices of the first electrical appliance can obtain the data indicative of the request via a wireless network. It should be understood that the method 400 proceeds to (404) in response to obtaining the data indicative of the request at (402).

At (404), the method 400 includes determining, by the one or more control devices, whether any of the plurality of electrical appliances are currently configured in the second power mode. If the one or more control devices determine another electrical appliance of the plurality of electrical appliances is currently configured in the second power mode, the method 400 proceeds to (406). Otherwise, the method 400 proceeds to (408).

At (406), the method 400 includes adding, by the one or more control devices, the request of the second electrical appliance to a queue and reverting to (404) until the one or more control devices determine another electrical appliance of the plurality of electrical appliances is not currently configured in the second power mode.

At (408), the method 400 includes transmitting, by the one or more control devices, data indicative of approval of the request. In some implementations, the one or more control devices of the first electrical appliance can transmit the data indicative of approval of the request via the AC circuit. In alternative implementations, the one or more control devices of the first electrical appliance can transmit the data indicative of approval of the request via a wireless network.

Figure 5:
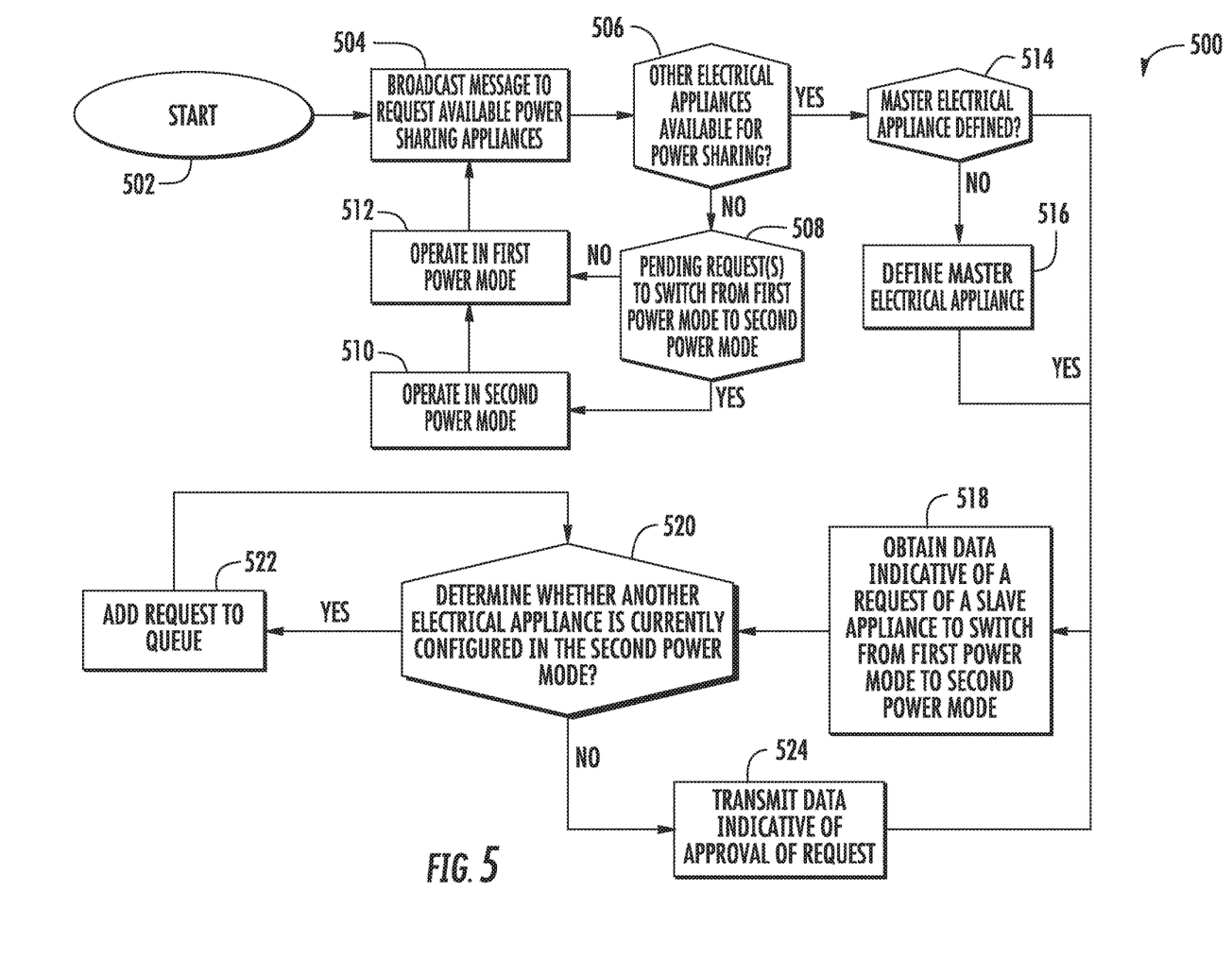
FIG. 5 depicts a flow diagram of a method for power sharing between a plurality of electrical appliances according to example embodiments of the present disclosure.

Referring now to FIG. 5, a flow diagram of another method 500 for power sharing between a plurality of electrical appliances electrically coupled to an AC circuit is provided according to example embodiments of the present disclosure. In general, the method 500 will be discussed herein with reference to the system 300 described above with reference to FIGS. 2 and 3. In addition, although FIG. 5 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (502), the method 500 includes activating (e.g., powering on) a first electrical appliance of the plurality of electrical appliances electrically coupled to the AC circuit. At (504), the method 500 includes communicating, by one or more control devices of the first electrical appliance, a message to discover other electrical appliances available for power sharing. In some implementations, one or more electrical appliances available for power sharing can communicate a reply message to the one or more control devices of the electrical appliance that communicated the message to discover other electrical appliances available for power sharing. For instance, the reply message can include one or more parameters identifying the electrical appliance available for power sharing.

At (506), the method 500 includes determining, by the one or more control devices of the first electrical appliance, whether there are any electrical appliances available for power sharing. If the one or more control devices of the first electrical appliance determine there are no electrical appliances available for power sharing, the method 500 proceeds to (508). Otherwise, the method 500 proceeds to (514).

At (508), the method 500 includes determining, by the one or more control devices of the first electrical appliance, whether any pending request exists for the first electrical appliance to switch from a first power mode to a second power mode. If the one or more control devices of the first electrical appliance determine there is a pending request for the first electrical appliance to switch from the first power mode to the second power mode, the method 500 proceeds to (510). Otherwise, the method 500 proceeds to (512) and continues to operate in the first power mode.

At (510), the method 500 includes switching, by the one or more control devices, the first electrical appliance from the first power mode to the second power mode. In some implementations, the first electrical appliance can operate in the second power mode for a predetermined amount of time. In alternative implementations, the first electrical appliance can operate in the second power mode until the one or more control devices receive a request to switch the electrical appliance back to the first power mode. When predetermine amount of time lapses or the one or more control devices receive a request to switch the electrical appliance back to the first power mode, the method 500 proceeds to (512) and the first electrical appliance is configured in the first power mode.

At (514), the method 500 includes determining, by the one or more control devices, whether a master electrical appliance of the plurality of electrical appliances is already defined. If the one or more control devices determine a master electrical appliance is not already defined, the method 500 proceeds to (516). Otherwise, the method 500 proceeds to (518).

At (516), the method 500 includes having the one or more control devices of each of the plurality of electrical appliances available for power sharing, including the first electrical appliance, generate a random number to determine the master electrical appliance. For instance, in some implementations, the electrical appliance corresponding to the one or more control devices that generated the highest random number can be designated the master electrical appliance. It should be understood that every other electrical appliance included in the plurality of electrical appliances available for power sharing can be designated as a slave electrical appliance. It should also be understood that any suitable method can be implemented to determine the master electrical appliance.

At (518), the method 500 includes obtaining, by the one or more control devices of the master electrical appliance, data indicative of a request for a slave electrical appliance to switch from the first power mode to the second mode. In some implementations, the one or more control devices of the master electrical appliance can obtain the data indicative of the request via the AC circuit. In alternative implementations, the one or more control devices of the master electrical appliance can obtain the data indicative of the request via a wireless network. It should be understood that the method 500 proceeds to (520) in response to obtaining the data indicative of the request at (518).

At (520), the method 500 includes determining, by the one or more control devices of the master electrical appliance, whether any of the plurality of electrical appliances are currently configured in the second power mode. If the one or more control devices determine another electrical appliance of the plurality of electrical appliances is currently configured in the second power mode, the method 400 proceeds to (522). Otherwise, the method 500 proceeds to (524).

At (522), the method 500 include adding, by the one or more control devices of the master electrical appliance, the request of the second electrical appliance to a queue and reverting to (520) until the one or more control devices determine another electrical appliance of the plurality of electrical appliances is not currently configured in the second power mode.

At (524), the method 500 includes transmitting, by the one or more control devices, data indicative of approval of the request. In some implementations, the one or more control devices of the first electrical appliance can transmit the data indicative of approval of the request via the AC circuit. In alternative implementations, the one or more control devices of the first electrical appliance can transmit the data indicative of approval of the request via a wireless network. It should be appreciated that the method 500 can revert to (518)

Figure 6:
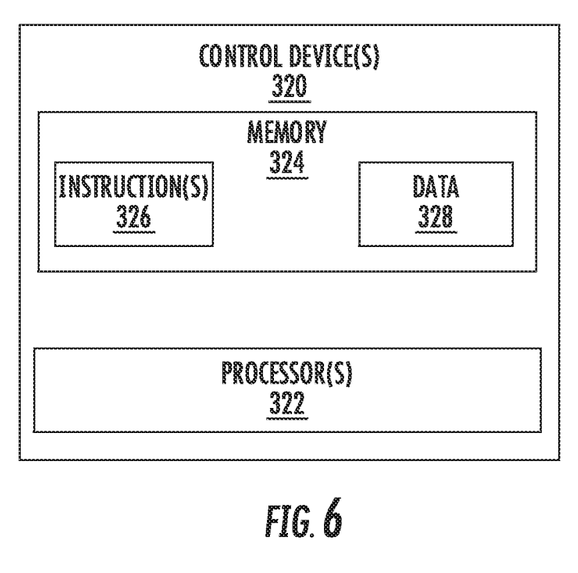
FIG. 6 depicts a block diagram of components of a control device according to example embodiments of the present disclosure.

FIG. 6 depicts a block diagram of the control device(s) 320 that can be used to implement methods according to example embodiments of the present disclosure. As shown, the control device(s) 320 may include one or more processors 162 and one or more memory devices 164. The processor(s) 322 can include any suitable processing device, such as a microprocessor, microcontroller, integrated circuit, logic device, or other suitable processing device. The memory device(s) 324 can include one or more computer-readable media, including, but not limited to, non-transitory computer-readable media, RAM, ROM, hard drives, flash drives, or other memory devices.

The memory device(s) 324 can store information accessible by the processor(s) 322, including computer-readable instructions 326 that can be executed by the processor(s) 322. The computer-readable instructions 326 can be any set of instructions that, when executed by the processor(s) 322, cause the processor(s) 322 to perform operations. The computer-readable instructions 326 can be software written in any suitable programming language or may be implemented in hardware. In some embodiments, the computer-readable instructions 326 can be executed by the processor(s) 322 to cause the processor(s) 322 to perform operations, such as allocating power amongst the plurality of electrical appliances such that only one of the plurality of electrical appliances is configured in the second power mode at a time to prevent nuisance tripping of the circuit breaker 130 (FIG. 1).

In some implementations, the memory device(s) 324 can be configured to store data 328 that can be accessed by the processor(s) 322. For example, the data 328 can include one or more table(s), function(s), algorithm(s), model(s), equation(s), etc. according to example embodiments of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for power sharing between a plurality of electrical appliances electrically coupled to an AC circuit, the method comprising:
    obtaining, by one or more control devices of a first electrical appliance of the plurality of electrical appliances, data indicative of a request of a second electrical appliance of the plurality of electrical appliances to switch from a first power mode to a second power mode in which the second electrical appliance is configured to draw more current than when the second electrical appliance is configured in the first power mode;
    responsive to obtaining the data indicative of the request, determining, by the one or more control devices, whether any of the plurality of electrical appliances are currently configured in the second power mode;
    responsive to determining none of the plurality of electrical appliances are currently configured in the second power mode, transmitting, by the one or more control devices, data indicative of approval of the request; and
    responsive to determining at least one of the plurality of electrical appliances is operating in the second power mode, adding, by the one or more control devices, the request to a queue.

2. The method of claim 1, wherein a current the second electrical appliance draws when configured in the first power mode is less than a current the second electrical appliance draws when configured in the second power mode.

3. The method of claim 1, wherein when one of the plurality of electrical appliances is configured in the second power mode, a total current the plurality of electrical appliances draw is less than a rated current of a circuit breaker associated with the AC circuit.

4. The method of claim 1, wherein transmitting data indicative of approval of the request comprises transmitting, by the one or more control devices, the data indicative of approval of the request to the second electrical appliance via the AC circuit.

5. The method of claim 1, wherein obtaining data indicative of a request of a second electrical appliance of the plurality of electrical appliances to switch from a first power mode to a second power mode comprises obtaining, by the one or more control devices, the data indicative of the request via the AC circuit.

6. The method of claim 1, wherein obtaining data indicative of a request of a second electrical appliance of the plurality of electrical appliances to switch from a first power mode to a second power mode comprises obtaining, by the one or more control devices, the data indicative of the request via a wireless network.

7. The method of claim 6, wherein providing data indicative of approval of the request comprises providing, by the one or more control devices, the data indicative of approval of the request to the second electrical appliance via the wireless network.

8. The method of claim 7, wherein the wireless network comprises a Bluetooth network or a Wifi network.

9. A system for power sharing between a plurality of electrical appliances electrically coupled to an alternating current (AC) circuit, the system comprising:
    a communication circuit onboard each of the plurality of electrical appliances to facilitate communication between each of the plurality of electrical appliances; and one or more control devices onboard each of the plurality of electrical appliances, the one or more control devices configured to:
    obtain data indicative of a request of an electrical appliance of the plurality of electrical appliances to switch from a first power mode to a second power mode in which the second electrical appliance is configured to draw more current than when the second electrical appliance is configured in the first power mode;
    determine whether any of the plurality of electrical appliances are operating in the second power mode in response to obtaining the data indicative of the request;

transmit data indicative of approval of the request in response to determining none of the plurality of electrical appliances are operating in the second power mode; and add the request to a queue in response to determining at least one of the plurality of electrical appliances is operating in the second power mode.

10. The system of claim 9, wherein when the electrical appliance of the plurality of electrical appliances is operating in the second power mode, a total current the plurality of electrical appliances draw is less than a rated current of a circuit breaker associated with the AC circuit.

11. The system of claim 9, wherein the one or more control devices are configured to obtain the data indicative of the request via the AC circuit.

12. The system of claim 11, wherein the one or more control devices are configured to transmit the data indicative of approval of the request via the AC circuit.

13. The system of claim 9, wherein the one or more control devices are configured to obtain the data indicative of the request via a wireless network.

14. The system of claim 13, wherein the one or more control devices are configured to transmit the data indicative of approval of the request via the wireless network.

15. The system of claim 13, wherein the wireless network comprises a Bluetooth network or a Wifi network.

16. The system of claim 9, wherein the one or more control devices onboard each of the plurality of electrical appliances is configured to receive direct current (DC) power from a switched mode power supply onboard a corresponding electrical appliance of the plurality of electrical appliances and configured to convert AC power an AC source provides via the AC circuit to the DC power for the one or more control devices.

17. The system of claim 16, wherein the communication circuit onboard each of the plurality of electrical appliances is configured to receive direct current power from a corresponding switched mode power supply.

18. The system of claim 9, wherein the one or more control devices are further configured to:

obtain user-input indicating an electrical appliance electrically coupled to a different AC circuit than the plurality of electrical appliances is not available for power sharing.

* * * * *